United States Patent
Grafton et al.

[15] 3,692,013
[45] Sept. 19, 1972

[54] GAS-FIRED COOKING GRILL

[72] Inventors: Jim R. Grafton, Moline, Ill.; Glenn E. Wilkins, Davenport, Iowa; Joseph F. Murphy, Moline, Ill.

[73] Assignee: Blackhawk Metal Products, Inc., Davenport, Iowa

[22] Filed: June 3, 1971

[21] Appl. No.: 149,522

[52] U.S. Cl. ............... 126/41 R, 126/25 R, 126/38
[51] Int. Cl. ......... A47j 37/00, F24b 3/00, F24c 3/14
[58] Field of Search........126/41 R, 25 R, 25 A, 38, 9

[56] References Cited

UNITED STATES PATENTS

| | | | |
|---|---|---|---|
| 2,898,846 | 8/1959 | Del Francia | 126/41 X |
| 3,474,724 | 10/1969 | Jenn | 126/41 X |
| 3,613,657 | 10/1971 | Wilska et al. | 126/41 R |
| 3,638,634 | 2/1972 | Bolitho | 126/41 R |
| 3,559,633 | 2/1971 | Born et al. | 126/38 |

Primary Examiner—Charles J. Myhre
Attorney—John M. Nolan

[57] ABSTRACT

A portable gas-fired cooking grill includes a receptacle having an open top and a cover swingably mounted on the receptacle to form a closed housing when the cover is swung to its closed position, the cover being swingable to an open horizontal position wherein the open bottom of the cover faces upwardly alongside the open top of the receptacle. Removable stand means are provided for supporting both the receptacle and the cover in their open condition above a supporting surface. A pair of grills are respectively removably mounted over the open top of the receptacle and the opening in the cover. A gas burner is disposed in the bottom of the receptacle and is supplied with gas from a removable propane tank, which is storable in the cover. A plurality of ceramic briquettes are releasably clamped in a predetermined pattern in the receptacle above the gas burner.

21 Claims, 9 Drawing Figures

PATENTED SEP 19 1972 3,692,013

INVENTORS
J. R. GRAFTON
G. E. WILKINS
J. F. MURPHY

INVENTORS
J. R. GRAFTON
G. E. WILKINS
J. F. MURPHY

GAS-FIRED COOKING GRILL

BACKGROUND OF THE INVENTION

This invention relates to a gas-fired barbecue grill of the type utilizing ceramic elements heated by a gas burner as a source of cooking heat, and more particularly to an improved portable grill of the above type.

A portable gas-fired grill is disclosed in our copending patent application Ser. No. 74,747, filed September 23 1970, now U.S. Pat. No. 3,646,928. As pointed out in said prior application, gas-fired cooking grills of the type utilizing a gas burner to heat ceramic briquettes, which in turn supply heat to the food, have become quite popular. For the reasons set forth in said prior application, a portable grill of said type has many advantages.

The grill described in said application included a cast aluminum cooking grid or grill, and the ceramic briquettes were attached to the underside of the cooking grill.

SUMMARY OF THE INVENTION

According to the present invention, improved means are provided for removably mounting the ceramic briquettes above the burner in such a portable gas-fired grill. Another feature of the present invention resides in provision of stand means for supporting the grill above a supporting surface to provide better access to the grill and to prevent the marring of the supporting surface by heat from the grill. More specifically, novel, relatively inexpensive, easily mounted stand means are provided for supporting the grill and its cover.

Another feature of the invention resides in the provision of a grill over the open portion of the cover, the grill functioning both as a supporting surface for noncooking food, utensils, or the like, during operation of the grill and also functioning to clamp such items as the gas supply and stand when the grill is being transported.

Another feature of the invention resides in a novel arrangement wherein the briquettes are clamped between two grills, the grills and the briquettes clamped therebetween being reversible to expose alternate sides of the briquettes to the burner so that grease which accumulates on the top of the briquettes can be burned off by simply reversing the grills.

Still another feature of the invention resides in the provision of novel clamping means, which permit easy removal or attachment of the briquettes to the grill.

An important feature of the invention resides in the provision of an inexpensive grill as opposed to the cast aluminum grill in the prior application, as well as inexpensive means for fastening the briquettes to the grill.

DESCRIPTION OF THE PREFERRED EMBODIMENT

Figure 1:
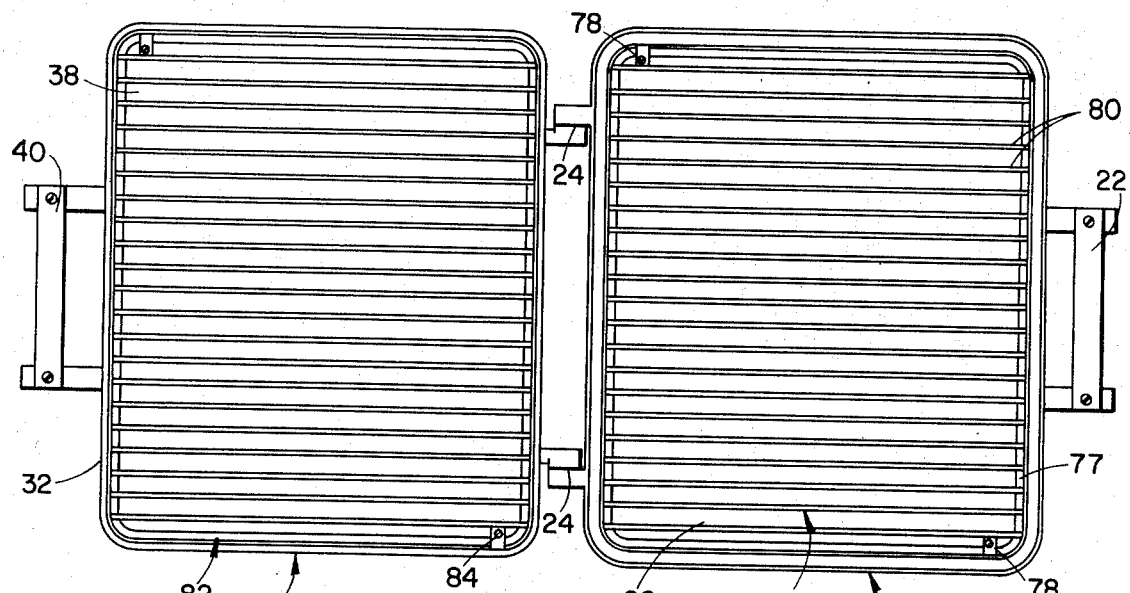
FIG. 1 is a top plan view of the cooking grill with the cover swung back to its open position.

The invention is embodied in a portable grill having a closed housing substantially similar to that shown in the applicant's copending application Ser. No. 74,747, now U.S. Pat. No. 3,646,928. The housing includes a bottom member or receptacle 10 having a generally rectangular flat bottom 12 and upwardly and outwardly tapered side walls 14. Each side wall 14 has an inward step or offset 16 a short distance above the bottom 12, and the portions of the side walls below the step 16 are provided with a number of holes 18, which function as vent holes. The upper portion of the side walls 14 are vertical and define a generally rectangular open top 20. A handle 22 extends forwardly from the front of the receptacle adjacent the open top, and a pair of vertical flanges 24 project rearwardly from the rear wall of the receptacle 10.

Figure 2:
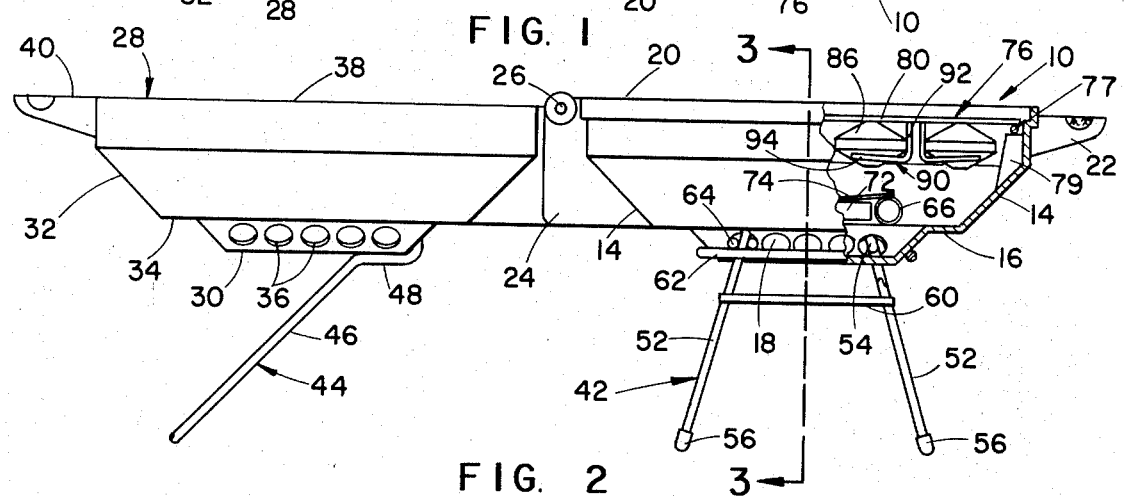
FIG. 2 is a side elevation view of the grill in its open position and with a portion of the bottom receptacle broken away to reveal the mounting of the briquettes.

A transverse, horizontal hinge 26 is provided at the upper end of each flange 24, and a cover 28, which is substantially similar to the receptacle 10, is swingable on the hinge 26 between an open condition, such as shown in FIGS. 1 and 2, wherein it is disposed at the same level and adjacent to the receptacle, and a closed condition wherein it covers the open top 20 of the receptacle. The cover 28 has a flat, generally rectangular top 30 similar to the bottom 12 of the receptacle, the top 30 facing downwardly when the cover is in its open condition as illustrated. Like the receptacle 10, the cover has tapered side walls 32 with a step or offset 34 adjacent the top 30. The offset portion of the side walls again have a plurality of holes 36 adjacent to the top 30, which function as vent holes. The lower portion of the side walls are vertical and define an open bottom 38, which mates with the open top 20 of the receptacle when the cover is swung to its closed position, the upper edge of the receptacle side walls being flared to receive the bottom portions of the cover side walls. A handle 40 projects forwardly from the front wall of the cover adjacent to the open bottom 38 and mates with the handle 22 when the cover is in its closed position to form a single unitary handle, both the handle 22 and the handle 40 having semi-cylindrical handle members which mate to form a cylindrical handle.

Figure 6:
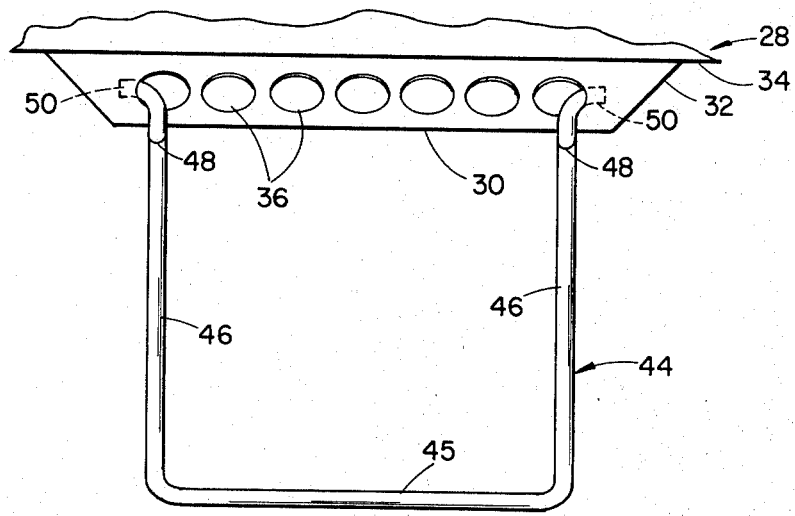
FIG. 6 is an enlarged elevation end view of the lower portion of the cover showing the mounting of the stand on the cover.

The bottom member or receptacle 10 is supported on a removable bottom stand 42, while the cover is supported on a removable stand 44 when it is swung to its open position, as shown in FIG. 2. Since the cover is partially supported on the hinge 26, the cover stand 44 can be relatively simple. As shown, the stand 44 is simply a formed U-shaped wire member having a horizontal bottom portion 45, which engages the supporting surface, and a pair of upwardly extending legs 46. When the stand 44 is attached to the cover as illustrated, the legs 46 are inclined and include a horizontal portion 48 adjacent their upper ends, which are provided with laterally extending hooks 50. To install the stand on the cover, the upper ends of the legs 46 are squeezed together and the hooks 50 are inserted into the outermost holes 36 in the cover side wall 32 adjacent the receptacle. When the legs are released, the hooks normally engage the interior of the cover while the flat cover top 30 rests on the horizontal portion 48 of the legs, as shown in FIGS. 2 and 6. To easily remove the stand, the legs are simply compressed until the hooks clear the side walls of the holes, whereupon the hooks are removed from the holes.

The receptacle stand 42 is somewhat more complicated than the cover stand since it totally supports the receptacle 10. The stand 42 includes four upwardly and inwardly inclined legs 52, each of which is provided with a hook 54 at its upper end and a rubber tip 56 at its lower end. The legs 52 on the right side of the stand are joined by a crossbar 58 and the legs 52 on the left side of the stand are similarly joined by a crossbar 60. All of the legs are interconnected by a rectangular wire member 62, which is slightly larger than the rectangular bottom 12 and is adapted to fit over the bottom 12. The upper end of each leg 52 is connected to the rectangular member 62 adjacent one of the four corners by a U-shaped pivot member 64, each pivot member having its legs welded to the rectangular member and having its bight portion pivotally received in the hook at the upper end of the respective leg. As is apparent from the drawings, the right pair of legs 52, which are rigidly connected by the right crossbar 58, are swingable about the pivot members 54 in a transverse direction, and the left-hand legs, which are rigidly connected by the left crossbar 60, are similarly swingable in a transverse direction about their pivot members 64.

Figure 7:
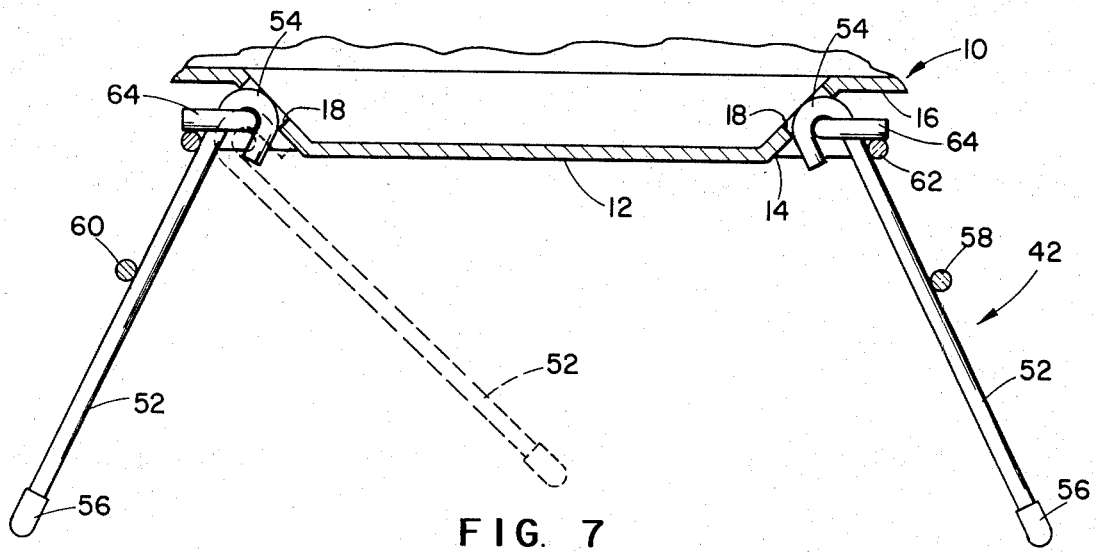
FIG. 7 is an enlarged side elevation section of the lower portion of the receptacle and the receptacle stand, the stand being shown swung to its unlocked position in dotted lines.
Figure 8:
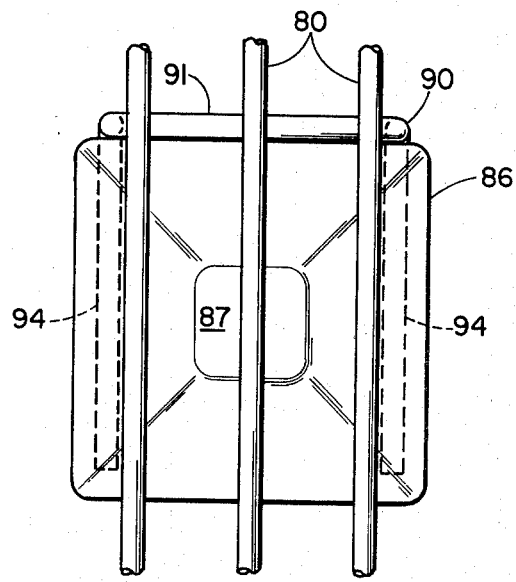
FIG. 8 is an enlarged plan view of a briquette and the clamp for attaching the briquette to the grill.

The right-hand legs are so spaced that their upper ends are engageable with the outermost holes 18 on the right receptacle side wall, while the left-hand legs are similarly spaced so that they are engageable with the outermost holes 18 on the left side wall 14. Also, as best seen in FIG. 7, the right and left pair of legs are so spaced by the rectangular member 62 that when the hooks 54 of the right-hand legs are inserted in the corresponding holes 18, as illustrated, and when the left-hand legs are swung toward the right-hand legs, as shown in dotted lines in FIG. 7, the hooks on the upper end of the left-hand legs will clear the side wall, permitting the left-hand legs to be moved to the dotted line position in FIG. 7. When the stand is placed in this position, the left-hand legs can be pivoted about their pivots 64 to the position shown in full lines in FIG. 7, the swinging of the legs causing the rounded portion of the hooks 54 to engage the corresponding holes 18. When the upper ends of the left-hand hooks are thus cammed into the corresponding holes, the ends of all four legs are firmly engaged in the corresponding holes, and the weight of the receptacle will lock the legs in the operative position. To remove the receptacle stand 42, the receptacle is simply tilted on its side while one set of the legs is swung toward the opposite set to remove the hooks from the corresponding holes and permit removal of the stand.

A gas burner is disposed in a lower portion of the receptacle 10, the burner herein comprising a pair of parallel burner tubes 66 having their outer ends 68 projecting through holes in one of the side walls and their inner ends clamped at 70 to the opposite side wall, the burners being provided with a large number of gas outlet openings and having fittings at their outer ends 68 for connection to a gas supply line. As described in the applicants' copending patent application, the outer rims of the tubes are preferably connected to a propane gas bottle, which can be stored in the cover when the grill is not in use. A cross tube 72 connects the two burner tubes 66 and a clamp 74 on top of the cross tube locks the burner tubes in place.

A rectangular grill 76 has substantially the same dimension as and fits within the open top 20 of the receptacle 10. The grill is of conventional spot-welded wire construction and includes a rectangular outer frame 77 secured by removable clamps 78 to a shoulder 79 on the interior of the receptacle side walls. Parallel wires 80 secured to the frame at relatively closely spaced intervals form the food-supporting surface.

A similar grill 82 is removably secured over the cover opening 38 by clamps 84. The grill 82 forms a surface for supporting cooking utensils and the like, or food not being cooked, when the grill is in use, and also functions to clamp such items as a propane tank, fittings, and the stands 42 and 44 within the cover 28 when the grill is not in use, the easily removable clamps 84 permitting quick access to the cover interior.

A plurality of formed ceramic briquettes 86 are suspended from the underside of the grill 76 in a predetermined pattern. The briquettes are of the type that are now commercially available and have a rectangular horizontal cross section with convex tops 87 and convex bottoms 88 similar to a conventional charcoal briquette, the tops and bottoms being in the general form of a truncated pyramid. In the illustrated embodiment, the briquettes are arranged in four rows with five briquettes in each row, the burner tubes 66 being generally parallel and between the adjacent rows.

Each briquette 86 is removably secured to the underside of the grill 76 by a clamp 90. Each clamp has a generally inverted U-shape with a horizontal or bight portion 91 spanning and welded to three wires 80 of the grill 76. Depending from the opposite ends of the horizontal portion 91 are a pair of legs 92, having a length less than the thickness of a briquette, and a pair of horizontal, parallel fingers 94 respectively extend in the same direction from the bottom ends of the legs 92, the fingers 94 being spaced a lesser distance than the width of the briquette. The fingers 94 are deflectable downwardly and engage the bottom 88 of the briquette on opposite sides of the bottom apex, thereby exerting an upward force on the briquette to clamp it against the bottom of the grill wires 80. As is apparent, the briquettes can easily be removed from the clamps 90 by simply moving them horizontally along the fingers 94 until they clear the fingers, and can conversely be replaced by forcing them between the fingers and the grill until they engage the legs 92 of the clamp.

Figure 3:
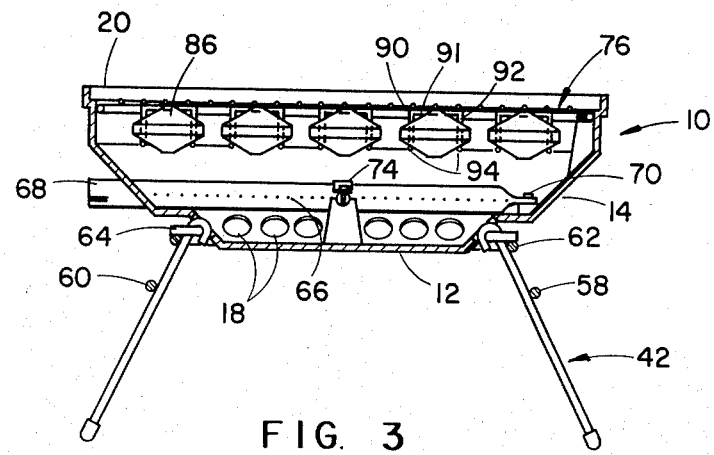
FIG. 3 is a section as viewed generally along the line 3—3 of FIG. 2.
Figure 4:
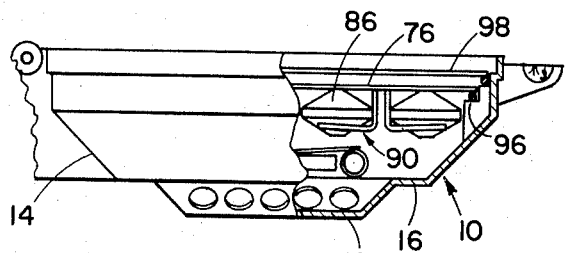
FIG. 4 is a side elevation view of the lower part of the grill similar to FIG. 2 but showing a slightly different embodiment of the invention.

In the embodiment illustrated in FIGS. 1, 2 and 3, the briquettes are suspended from the cooking grill. A second embodiment is shown in FIG. 4, wherein a step shoulder 96 is provided on the interior of the receptacle, and the grill 76 from which the briquettes 86 are suspended is supported on the lower step, while an additional grill 98 is supported on a higher step of the shoulder immediately above the briquette-supporting grill. As is apparent, the upper grill 98 is similar to the grill 76 and merely functions to support the cooking food a short distance above the briquettes.

Figure 5:
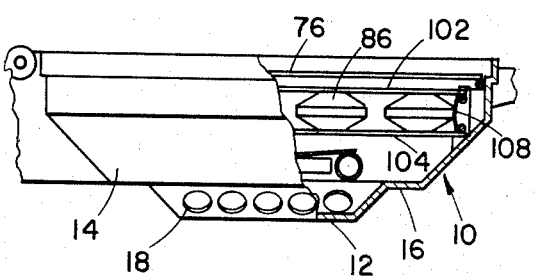
FIG. 5 is a view similar to FIG. 4 but showing still another embodiment of the invention.
Figure 9:
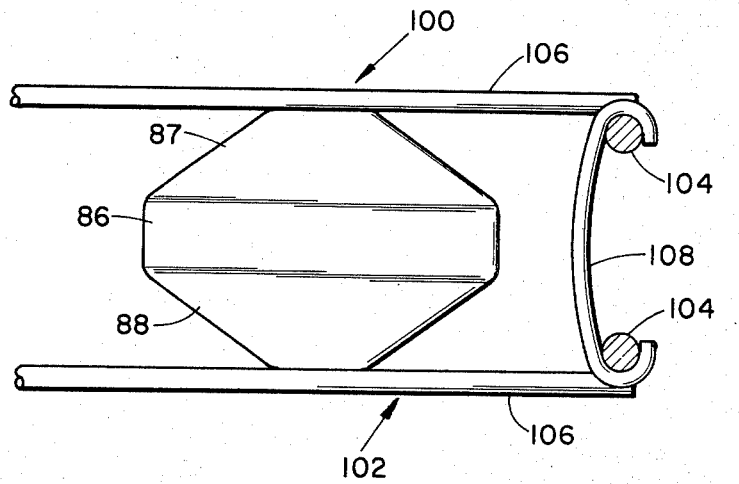
FIG. 9 is an enlarged side elevation view of a briquette and a portion of the briquette mounting means shown in FIG. 5.

A third embodiment of the invention is shown in FIGS. 5 and 9, wherein the food is supported on the grill 76 that is described in the first embodiment. However, rather than having the briquettes suspended from the grill 76, the briquettes are mounted independently of the grill 76 and supported between two similar grills 100 and 102, which are similar to but slightly smaller than the grill 76 and are supported on the side walls 14 of the receptacle below the grill 76. The grills 100 and 102 again include a rectangular frame 104 with a plurality of parallel wires 106 welded to the frame, and the briquettes are placed in the above-described pattern between the grills 100 and 102, which are then clamped together by a number of clip-type clamping devices 108, which engage the frames 104 of the respective grills 100 and 102 and urge them toward one another to clamp the briquettes securely therebetween. To replace the briquettes, the clips 108 are simply removed to allow the separation of the grills 100 and 102. This embodiment offers the advantage of permitting reversal of the briquettes, so that when the upper side of the briquettes become coated with grease or the like from the cooked food, the entire unit comprising the grills 100 and 102 and the briquettes clamped therebetween can be reversed, so that the material-laden side of the briquettes are exposed to the burners, which will burn off the material. As an economy, the grill 76 could be eliminated, so that the food would be cooked on top of the upper grill 100.

As is apparent, in all cases the briquettes are securely clamped in a predetermined orientation, so that they will hold their orientation even when the grill is being transported in an upright condition via the handle 22. As is also apparent, the easily removable stands 42 and 44, along with the gas supply and fittings can be stored and clamped within the cover 32, so that the grill can be transported in the same manner as a briefcase or the like.

We claim:

1. A gas-fired cooking unit comprising: a receptacle having an open top; a gas burner means mounted in a lower portion of the receptacle; a first grill mounted in the receptacle above the burner means and substantially spanning the open top of the receptacle; a plurality of non-combustible, heat absorbing and radiating briquettes; and clamping means for removable mounting each briquette to the underside of the grill in a predetermined pattern, each clamping means including horizontal, resilient, finger means spaced from the bottom of the grill and deflectable downwardly to receive a briquette between the finger means and the bottom of the grill, the finger means engaging the bottom of the briquette and exerting an upward force thereon to clamp the briquette to the bottom of the grill.

2. The invention defined in claim 1 wherein the briquettes have generally rectangular horizontal cross sections with convex tops and bottoms, and each finger means includes a pair of generally parallel horizontal fingers engageable with the convex bottom of the briquette adjacent the opposite sides of the briquette.

3. The invention defined in claim 2 wherein each clamping means includes an inverted U-shaped member having a horizontal bight portion attached to the grill and depending legs, the fingers respectively extending horizontally from the lower ends of the depending legs.

4. The invention defined in claim 3 wherein the grill is formed of connected parallel wires and the clamping means comprises a formed wire, the bight portion of each clamping means transversely spanning and being attached to at least two wires of the grill.

5. The invention defined in claim 3 and including a second grill mounted in the receptacle above the first grill for supporting food above the first grill.

6. The invention defined in claim 2 and including a cover having an open bottom adapted to fit over the open top of the receptacle and hinge means operatively connecting the cover to the receptacle to permit swinging of the cover between a closed position wherein its open bottom mates with the open top of the receptacle to form a substantially closed housing and an open position wherein the open bottom of the cover faces upwardly adjacent to the open top of the receptacle.

7. The invention defined in claim 6 and including a third grill means removably mounted over the open bottom of the cover and adapted to support food and other objects when the cover is in its open position and to retain objects within the cover.

8. The invention defined in claim 6 and including a first stand means operatively connected to the receptacle for supporting the receptacle in a horizontal condition above a supporting surface and a second stand means operatively connected to the cover for supporting the cover in its open condition.

9. A gas-fired cooking unit comprising: a receptacle having an open top; a gas burner means mounted in a lower portion of the receptacle; first and second horizontal grills respectively mounted in the receptacle above the gas burner means and substantially spanning the receptacle opening; means for removably interconnecting and spacing the first and second grills; and a plurality of non-combustible, heat absorbing and radiating briquettes disposed between the first and second grills and clamped therebetween in a predetermined pattern.

10. The invention defined in claim 9 wherein the first and second grills and the briquettes clamped therebetween are removably mounted in the receptacle and reversible to expose alternate sides of the briquettes to the burner means.

11. The invention defined in claim 10 and including a third grill means mounted in the receptacle adjacent and above the first and second grill means and spanning the open top to support food material above the first and second grills.

12. A portable, gas-fired cooking grill comprising: a receptacle having an open top; a cover having an open bottom substantially conforming to the open top of the receptacle; hinge means operatively connecting the cover to the receptacle for swinging between a closed position, wherein its open bottom mates with the open top of the receptacle to form a substantially closed housing, and an open position wherein its open bottom faces upwardly adjacent to the open top of the receptacle; a first stand means operatively connected to the receptacle for supporting the receptacle in a horizontal condition above a support surface; a gas burner means disposed in a lower portion of the receptacle; a first grill mounted in the receptacle above the burner means and substantially spanning the open top of the receptacle; a plurality of non-combustible, heat radiating and absorbing briquettes; and means for mounting the briquettes in a predetermined pattern between the first grill and the burner means.

13. The invention defined in claim 12 and including a second stand means operatively connected to the cover for supporting it in the open position.

14. The invention defined in claim 13 wherein the first and second stand means are removably attached to the receptacle and the cover.

15. The invention defined in claim 12 wherein the receptacle has a generally horizontal bottom with tapered side walls having a plurality of vent holes adjacent to the bottom, the first stand means being removably mounted in said vent holes.

16. The invention defined in claim 15 wherein the first stand means includes a first pair of connected legs having upper ends engageable with a first pair of vent holes in one side of the receptacle, a second pair of connected legs having their upper ends engageable with a second pair of vent holes in the opposite side of the receptacle, and means swingably interconnecting the first and second pair of legs for swinging between a parallel position wherein the upper ends of the first and second pairs of legs are spaced a greater distance than the distance between the respective holes to permit removal or insertion of the upper end from or into the holes and a traphezoidal position wherein the upper ends are spaced a lesser distance than the distance between the holes and are thereby locked into the respective holes.

17. The invention defined in claim 12 and including means for removably clamping the briquettes to the first grill.

18. The invention defined in claim 17 wherein said means for clamping the briquettes to the first grill includes a second grill removably connected to and spaced from the first grill, the briquettes being clamped between said first and second grills.

19. A portable gas-fired cooking unit comprising: a receptacle having an open top, a bottom, and side walls; a cover having an open bottom conforming to and mateable with the open top of the receptacle to form a hollow, substantially closed housing; a gas burner means mounted in a lower portion of the receptacle; a flat cooking grill spanning the open top of the receptacle; a pair of flat, parallel perforated retainer members spanning the receptacle below and parallel to the cooking grill and above the gas burner means; a bed of non-combustible, heat-absorbing and radiating elements disposed between the retainer members; clamping means interconnecting the retainer members to clamp said elements therebetween; and a portable gas supply removable connected to the burner means for supplying gas thereto.

20. A portable gas-fired cooking unit comprising: a receptacle having an open top, a bottom, and side walls; a cover mateable with the open top of the receptacle to form a hollow, substantially closed housing; a gas burner means above the bottom of the receptacle; a cooking grill spanning the open top of the receptacle above the burner means; a pair of retainer grills removably supported on the side walls parallel to and below the cooking grill and above the burner means; means interconnecting the retainer grills for holding the retained grills a predetermined distance apart; a bed of non-combustible heat-absorbing and radiating elements retained between the retainer grills; aperture means in one of the receptacle walls; and connecting means extending through said aperture means and operative to connect the burner means to a portable propane bottle.

21. The invention defined in claim 20 wherein the means interconnecting the retainer grills comprises separable clamping means, the bed of non-combustible elements being firmly clamped in a single layer between said retainer grills.

* * * * *